April 23, 1968     D. J. HARDY ET AL     3,379,270

VESSEL CONVERTIBLE TO WATERCRAFT AND AIR CUSHION VEHICLE

Filed Oct. 11, 1965     4 Sheets-Sheet 1

INVENTORS
DEREK J. HARDY
LAVIS A. H. RIDDLE

BY *Larson and Taylor*

ATTORNEYS

INVENTORS
DEREK J. HARDY
LAVIS A. H. RIDDLE

BY *Larson and Taylor*

ATTORNEYS

April 23, 1968   D. J. HARDY ET AL   3,379,270
VESSEL CONVERTIBLE TO WATERCRAFT AND AIR CUSHION VEHICLE
Filed Oct. 11, 1965   4 Sheets-Sheet 4

INVENTORS
DEREK J. HARDY
LAVIS A. H. RIDDLE

BY *Larson and Taylor*

ATTORNEYS and Lavis

United States Patent Office 3,379,270
Patented Apr. 23, 1968

3,379,270
VESSEL CONVERTIBLE TO WATERCRAFT
AND AIR CUSHION VEHICLE
Derek James Hardy, Cowes, Isle of Wight, and Lavis Albert Henry Riddle, East Cowes, Isle of Wight, England, assignors to Westland Aircraft Limited, Yeovil, Somerset, England
Filed Oct. 11, 1965, Ser. No. 494,551
Claims priority, application Great Britain, Oct. 15, 1964, 42,035/64
9 Claims. (Cl. 180—127)

ABSTRACT OF THE DISCLOSURE

A displacement watercraft is convertible into an air cushion vehicle through the control of extensible inner and outer skirts which are retracted to a position adjacent the sponson of the watercraft during normal operation. The outer skirt is supported intermediate its edges so that it is folded in two when retracted.

---

This invention relates to displacement watercraft having provision for the generation of a gaseous cushion formed and partly contained beneath the craft by skirting arrangements brought into operation when it is desired to support the craft on an air or gas cushion.

It is an object of the invention to provide a displacement watercraft having good seakeeping properties, and which has facilities by which it may move from one area of operation to another as an air cushion vehicle at a speed which is higher than can be attained in the displacement condition.

According to the invention we provide a displacement watercraft having provision for the generation of an air cushion, comprising a hull having a central keel member and a sponson extending therearound and a retractable skirt disposed around the outer periphery of the sponson.

According to a further aspect of the invention we provide a displacement watercraft having provision for the generation of an air cushion, comprising a hull having a central keel member and a sponson extending therearound, a flexible retractable outer skirt member disposed around the outer periphery of the sponson, and a flexible retractable inner skirt member disposed around the inner periphery of the sponson.

Preferably the outer skirt is inflatable and movable from its retracted to its extended position by the introduction of pressure fluid into it, and the lower edge of the inner skirt is spaced from the lower edge of the outer skirt by nozzle members serving to secure the edges in relation to one another and to define peripheral jets which assist in building up and maintaining the air cushion upon which the watercraft is supported when it is operating as an air cushion vehicle.

The inner skirt is supported intermediately by, for example, restraining cables and has retraction members, such as cables, arranged to draw both inner and outer skirts from their extended position to their retracted position against the sponson.

However, if a non-flexible skirt is provided, it may take the form of a multiplicity of overlapping plates of, for example, sheet steel or light alloy hinged to the outer periphery of the sponson and in substantially fluidtight relationship when extended. The length of the plates measured in the direction of the periphery of the craft varies according to their position on the periphery of the craft, the longest being at the sides where the curvature of the periphery is at a minimum and shortest at the bow where the curvature is at a maximum. The skirt in its flexible form can also be inflatable and forms a preferred embodiment, now to be described.

The skirt is restrained in the extended position and retracted by members, for example, cables, arranged so that when the skirt is extended the cables oppose the outward force on the skirt generated by the pressurised air cushion and to draw the skirt from its extended position to its retracted position against the sponson.

Further objects and advantages of the invention will become more readily apparent from the following detailed description, with reference to the accompanying drawings, which are by way of example, and in which.

In carrying one embodiment of the invention into effect we provide a watercraft comprising a hull, generally indicated at 1, which is made of solid material, having a central keel member 2 of very substantial width when compared with the beam of the craft and of such depth as may be desired, and a platform above the keel 2 constituting a sponson 3 extending around the keel 2. The sponson 3 and the keel member 2 together form one rigid structure, the sponson being of any desired width and extending laterally and slightly upwardly to any desired extent.

Figure 5:
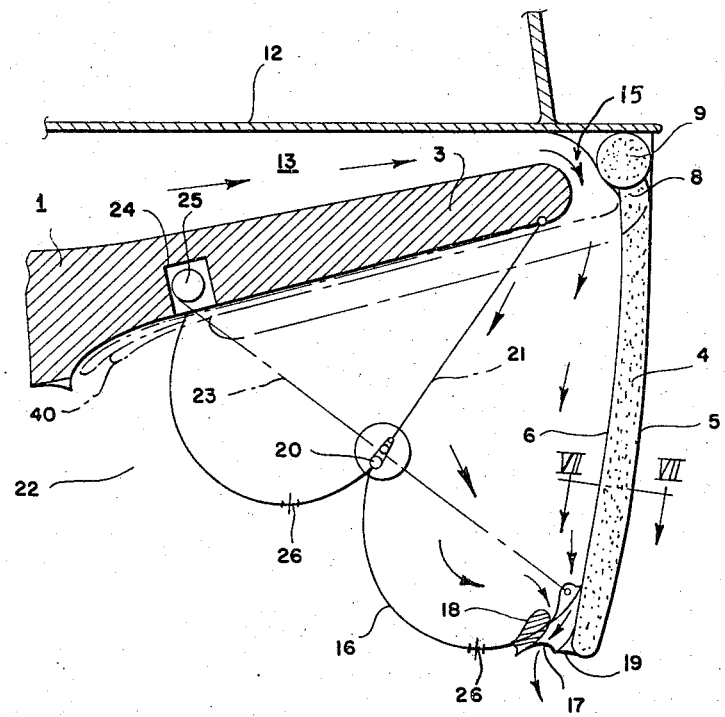
FIGURE 5 is an enlarged sectional elevation showing details of skirt operation.
Figure 6:
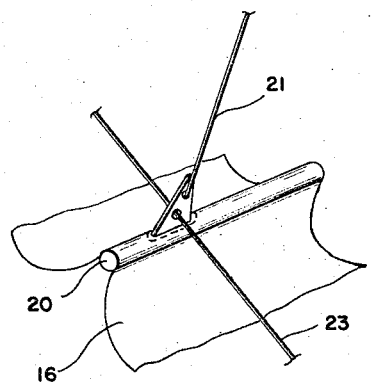
FIGURE 6 is a perspective scrap view of that part of FIGURE 5 which is enclosed in a circle on a still larger scale.
Figure 7:
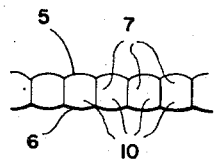
FIGURE 7 is a section on the line VII—VII of FIGURE 5.

Around the periphery of the sponson 3 there is disposed an inflatable outer skirt 4 of flexible material having two walls 5 and 6 connected together by flexible diaphragms 7 (FIGURE 7) to form a multiplicity of interconnected downwardly extending tubes 10 closed at their free or lower ends and located side by side. The open or upper ends 8 (FIGURE 5) of the tubes 10 are arranged to be in communication with a high pressure air supply duct 9 extending horizontally around the periphery of the sponson 3 just above the periphery of the outer skirt 4. The depth of the outer skirt 4 is slightly less than the width of the sponson 3, so that the skirt 4 may be retracted inwardly and upwardly to lie against the underside of the sponson 3 extending inwardly towards the outer vertical wall of the keel member 2. The outer skirt 4 may be divided into as many separate independent movable sections as are required, each section consisting of a plurality of the tubes 10 secured to their neighbours along their length. Preferably the depth of the outer skirt 4, when in the extended position, should be such that it does not extend below the rigid keel member 2.

Figure 1:
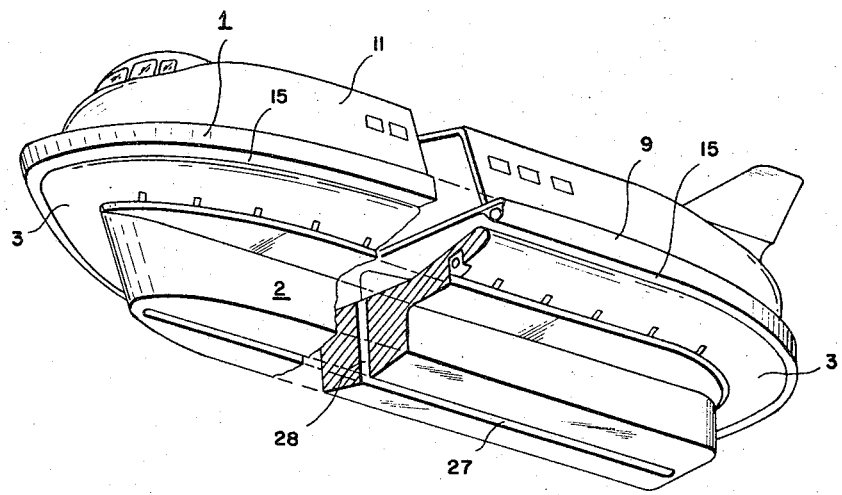
FIGURE 1 is a perspective view of the underside of the hull of the marine watercraft described in the invention with the skirts removed.
Figure 2:
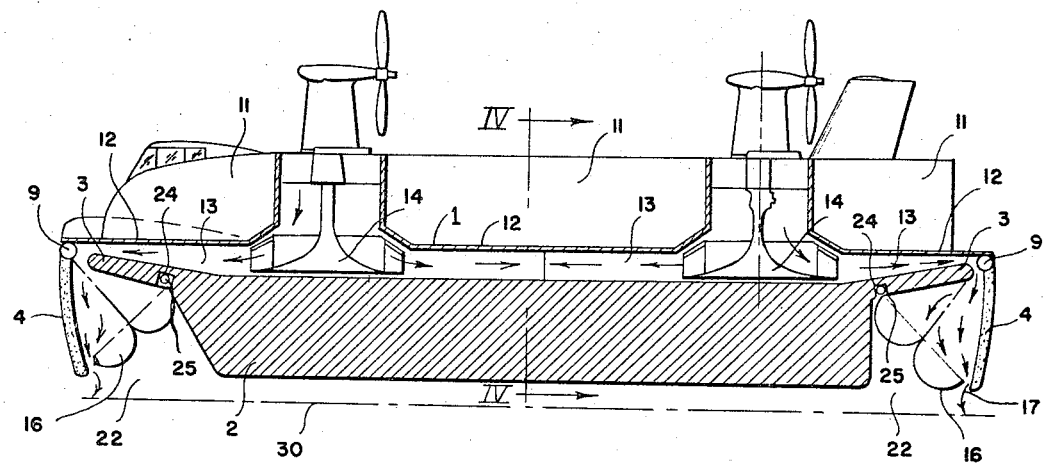
FIGURE 2 is a sectional side elevation of the watercraft illustrated in FIGURE 1, showing the preferred arrangements of the skirts.
Figure 3:
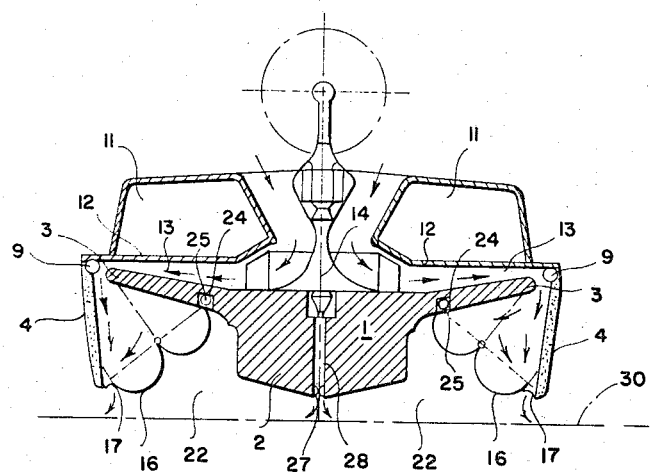
FIGURE 3 is a typical sectional end elevation of the watercraft illustrated in FIGURE 2, the section being on the centre line of one of the lift fan air intakes.

Above the upper surface of the structure consisting of the keel member 2 and sponson 3 there are disposed cabins 11, decking 12 and ducting 13 arranged to supply pressurised air fed from one or more lift fans 14 outwardly over the upper surface of the sponson 3 and around its periphery through a passage 15 defined on the one side by the periphery of the sponson 3 and on the other side by the high pressure air duct 9. This pressurised air from the lift fans 14 is led into a skirting arrangement below the sponson 3 constituted by the outer skirt 4 as described and an inner skirt 16 to be described hereinafter, and is then expelled through nozzles 17 located at the lower inside edge of the outer skirt to generate and maintain an air cushion beneath the craft. The path of the pressurised air is denoted by arrows in FIGURES 2, 3, 5 and, for another aspect of the invention, FIGURE 8.

The inner skirt 16 consists of a flexible substantially fluidtight web of suitable material, for example, "Terylene" fabric coated with "neoprene" rubber, extending from the under surface of the sponson 3, to which it is secured near its junction with the keel member 2 in a substantially fluidtight manner, outwardly to join the free or lower edge of the outer skirt, from which it is spaced at intervals by suitable tension members to form nozzles 17, from which the pressurised air from the skirting arrangement is expelled to provide a peripheral jet. Shaped fairing means 18 and 19 of spongy fluidtight material are provided adjacent the nozzle 17 on the inner and outer skirts 16 and 4 respectively to provide a smooth exit for the pressurised air at the nozzles.

The inner skirt 16 is supported along its median line by a series of tubes 20 which extend along its length approximately parallel with the outer skirt 4 and by a series of restraining cables 21 spaced around the periphery of the sponson 3 and secured at their lower ends to the tubes 20 and at their upper ends to the underside of the outer edge of the sponson 3. The flexible inner skirt 16 is, therefore, enabled to extend downwards and inwards into the air cushion area 22 only so far as it is allowed by the restraining cables 21 and tubes 20, and on entry of pressure air into the skirting arrangement the inner flexible skirt 16 balloons downwardly and inwardly on each side of the tubes 20 away from the outer skirt 4 and preferably should not extend below the depth of the keel member.

The skirting assembly is provided with retraction cables 23 which are attached at points spaced along the peripheral length of the jet nozzles 17. The retraction cables 23 pass inwardly to recesses 24 in the sponson 3 accommodating retraction cable drums 25 upon which the retraction cables 23 are wound. Suitable arrangements are made for driving the retraction cable drums 25, for example, electric motors, from the upper side of the sponson 3, control being exercised by the operating crew of the watercraft. The recesses 24 in which the drums 25 are accommodated on the lower side of the sponson are disposed within the area of the skirting arrangement between the outer skirt 4 and the inner skirt 16 and are shielded from water.

The inner flexible skirt is provided at intervals with suitably disposed drainholes 26 to allow water trapped in the ballooned shape of the inner skirt to drain away.

The air cushion area 22 bounded by the skirting assembly comprising the outer skirt 4, the inner skirt 16 and the pressurised air expelled from the peripheral nozzles 17 is divided into compartments for stability purposes. Conveniently the keel member 2 acts as a longitudinal barrier for this purpose, and its effectiveness is increased by providing a stability jet 27 along its lower centre line. Pressurised air is supplied to the stability jet 27 from the main ducting 13 via secondary ducts 28 extending through the keel member 2. Inflatable seals 29 are provided at the lower extremity of the stability jet 27 so that the jet may be closed when desired.

The lateral divisions of the air cushion area, which are not shown, may be in the form of single flexible walls, bulbous pressurised members or flexible ducts having jets at their lower extremities.

Flexible and/or inflatable stability keel elements may extend the rigid keel stability jet 27 if required.

Figure 4:
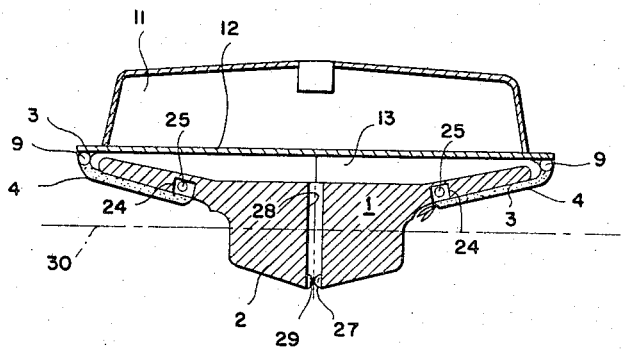
FIGURE 4 is an athwartships section on the line IV—IV of FIGURE 2 showing the skirts in the retracted positions.

To bring the skirting arrangement into its operational position, high pressure air, which may be tapped from the compressor of one of the main gas turbine engines or from any other suitable source, is admitted to the high pressure air supply duct 9 in communication with the outer skirt 4. The skirt is thereby forced downwardly and outwardly from its retracted position lying under the sponson 3 and in contact with it as illustrated in FIGURE 4, to a generally vertical position. At the same time the cable drums 25 are allowed to feed out the retraction cables 23 and the jet seal 29 is deflated. The inner flexible skirt 16 is drawn out from its stowed position (FIGURE 4) to its operating position in which it defines the inner side of the skirting arrangement. During this outward movement which is assisted by the operation of the lift fans 14 forcing pressurised air into the skirting arrangement, the restraining cables 21 remain taut and the inner skirt balloons downwardly and inwardly. Pressurised lift air issues from the nozzles 17 and stability jets 27 to build up and maintain an air cushion which raises the watercraft so that the position of the waterline 30 relative to the craft changes from that in the illustration of a displacement craft in FIGURE 4 to that of an air cushion vehicle illustrated in FIGURES 2 and 3.

To retract the skirting arrangement, the lift fans 14 are stopped, the high pressure air is cut off from the supply duct 9 serving the outer skirt 4 and the retraction cable drums 25 are operated to wind in the retraction cables 23. The restraining cables 21 remain taut and pivot inwardly about their point of attachment to the underside of the sponson 3, with the tubes 20. The outer skirt is drawn in by the retraction cables 23, together with the inner skirt 16, which folds in two due to the action of the restraining cables 21, which are shorter in length than the full depth of the skirting arrangement, and the tubes 20. The inner flexible skirt 16 is, therefore, drawn upwardly and inwardly to lie in two folded halves against the inner part of the under surface of the sponson 3 and the outer skirt 4 is drawn against the sponson 3, as illustrated by the chain dotted lines 40 in FIGURE 5 which show the skirting assembly in the retracted position. The skirting arrangement may be locked in the retracted position and the craft can operate as a displacement vessel.

Figure 8:
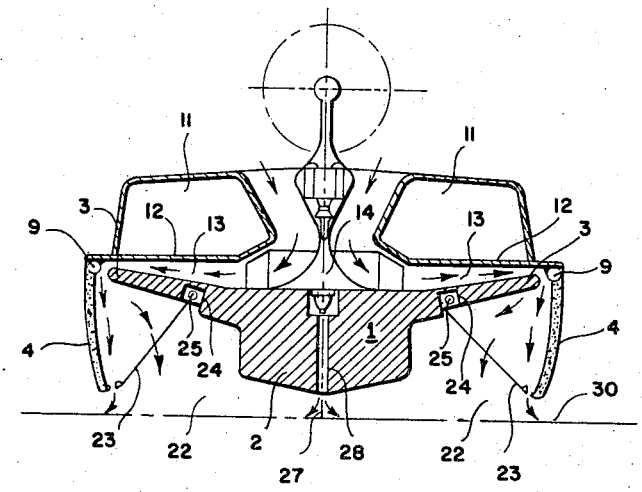
FIGURE 8 is a typical end elevation of the watercraft according to another aspect of the invention.

Another form of the invention is illustrated in FIGURE 8, where the inner skirt and its restraining arrangements are dispensed with.

This embodiment provides an outer skirt 4 which operates in the same manner as described previously, and which acts as the peripheral boundary to the air cushion. Pressurised air is fed from the ducting 13 to the air cushion area 22 within the periphery of the skirt 4 forming an air cushion vehicle of the plenum chamber type.

It will be appreciated that numerous modifications could be made which would still be within the scope of the invention. For example, the jet seal need not be limited to stability jets, but could also be applied to peripheral jets. Further, the seal need not be of an inflatable kind, but could, for example, be in the form of a plate spring loaded to the closed position and opened by the duct pressure.

It should also be understood that the space within the keel member and the sponson may be occupied by engines, storage arrangements for such items as fuel and water, and for additional cabin space.

We claim as our invention:

1. A displacement watercraft capable of being converted into an air cushion vehicle, said watercraft comprising, a central rigid keel member, a sponson extending around said keel member and comprising a surface having an inner and outer periphery, a pivotable, retractable outer skirt means disposed around the outer periphery of said sponson and a retractable inner skirt means disposed around said inner periphery, means securing the lower edges of said inner and outer skirt means in spaced apart relation to define nozzle means therebetween, whereby, when the craft is operating as an air cushion vehicle, air is emitted from the nozzle means to form a sustaining air cushion for said vehicle, said outer and inner skirt means each being movable between a retracted, inoperative position against the surface of said sponson wherein the watercraft operates as a displacement vehicle and an extended, operative position outwardly of said sponson wherein said watercraft operates as an air cushion vehicle.

2. A displacement watercraft as claimed in claim 1, wherein said outer skirt means comprises a wall of flexible material restrained at its lower edge, said wall being comprised of a multiplicity of tubes.

3. A displacement watercraft as claimed in claim 2, wherein said outer skirt is inflatable and is movable from its retracted to its extended position by the introduction of pressure fluid into it.

4. A displacement watercraft as claimed in claim 1, wherein said skirt means are retracted to a substantially horizontal position against said sponson.

5. A displacement watercraft as claimed in claim 1, wherein said central keel member is provided with stabilizing jets.

6. A displacement watercraft as claimed in claim 5, including ducts communicating with said jets, said ducts being provided with closure members.

7. A displacement watercraft as claimed in claim 6, wherein said closure members are inflatable.

8. A displacement watercraft as claimed in claim 1, further comprising means for supporting said inner skirt means, in the extended position, intermediate the edges thereof whereby said inner skirt means may be folded in two when moved to the retracted position thereof.

9. A displacement watercraft as claimed in claim 8 wherein said supporting means comprises restraining cables and wherein there are included retraction cables for drawing both of said outer and inner skirt means into the retracted positions thereof.

References Cited

UNITED STATES PATENTS

| | | | |
|---|---|---|---|
| 3,240,282 | 3/1966 | Taylor | 180—7 |
| 3,288,235 | 11/1966 | Jones | 180—7 |
| 3,289,778 | 12/1966 | Page et al. | 180—7 |

A. HARRY LEVY, *Primary Examiner.*